US010294650B2

(12) United States Patent
Wächter et al.

(10) Patent No.: US 10,294,650 B2
(45) Date of Patent: May 21, 2019

(54) MECHANICAL VALVE FOR WATERLESS URINAL

(71) Applicant: Falcon Waterfree Technologies, LLC, Los Angeles, CA (US)

(72) Inventors: Michael Wächter, Tägerig (CH); Manuel Peter, Hinwil (CH); Edward Michael Goldsmith, Encino, CA (US)

(73) Assignee: FALCON WATERFREE TECHNOLOGIES, LLC, Los Angeles, CA (US)

( * ) Notice: Subject to any disclaimer, the term of this patent is extended or adjusted under 35 U.S.C. 154(b) by 0 days.

(21) Appl. No.: 15/401,887

(22) Filed: Jan. 9, 2017

(65) Prior Publication Data

US 2017/0198469 A1 Jul. 13, 2017

Related U.S. Application Data

(60) Provisional application No. 62/276,180, filed on Jan. 7, 2016.

(51) Int. Cl.

| | |
|---|---|
| ***E03D 13/00*** | (2006.01) |
| ***A47K 11/12*** | (2006.01) |
| ***F16K 15/14*** | (2006.01) |
| ***E03C 1/298*** | (2006.01) |

(52) U.S. Cl.
CPC ............ *E03D 13/007* (2013.01); *A47K 11/12* (2013.01); *E03C 1/298* (2013.01); *F16K 15/147* (2013.01); *F16K 15/148* (2013.01)

(58) Field of Classification Search
CPC ....................................................... A61G 9/006
USPC ................................................ 4/144.1–144.3
See application file for complete search history.

(56) References Cited

U.S. PATENT DOCUMENTS

| | | | |
|---|---|---|---|
| 803,979 | A | 11/1905 | Bonnell |
| 2,382,427 | A | 8/1945 | Langdon |
| 3,047,013 | A | 7/1962 | Baumbach |
| 3,463,159 | A | 8/1969 | Heimlich |
| 3,967,645 | A | 7/1976 | Gregory |
| 4,084,606 | A | 4/1978 | Mittleman |
| 4,227,533 | A | 10/1980 | Godfrey |
| 4,340,977 | A | 7/1982 | Brownlee et al. |
| 4,387,749 | A | 6/1983 | Donisi |
| 5,193,585 | A | 3/1993 | Proffitt et al. |
| 5,908,129 | A | 6/1999 | Schutz |
| 7,530,369 | B2 | 5/2009 | Anderson |
| 9,097,355 | B2 | 8/2015 | Keller |
| 2002/0195141 | A1 | 12/2002 | Ruschke |

(Continued)

FOREIGN PATENT DOCUMENTS

| | | |
|---|---|---|
| EP | 1174549 | 1/2002 |
| EP | 1477617 | 11/2004 |

(Continued)

OTHER PUBLICATIONS

International Search Report of the International Searching Authority for PCT/US2017/012742; dated Apr. 20, 2017.

(Continued)

*Primary Examiner* — Lori Baker
(74) *Attorney, Agent, or Firm* — Tope-McKay & Associates

(57) ABSTRACT

A non-flushing urinal system with a large sealing and flow area using a bell-shaped valve with supporting ribs on its interior surface, which utilizes low "crack pressure," or ease of initial opening to create for high flow rate and superior sealing.

10 Claims, 16 Drawing Sheets

(56) References Cited

U.S. PATENT DOCUMENTS

| | | | |
|---|---|---|---|
| 2005/0263195 | A1 | 12/2005 | Dahm |
| 2006/0118189 | A1 | 6/2006 | Tekulve et al. |
| 2006/0253084 | A1 | 11/2006 | Nordgren |
| 2010/0219293 | A1 | 9/2010 | Seibt et al. |
| 2012/0167295 | A1 | 7/2012 | Fima |

FOREIGN PATENT DOCUMENTS

| | | |
|---|---|---|
| EP | 1579133 | 3/2011 |
| GB | 754497 | 7/1953 |
| GB | 2296309 | 6/1996 |
| GB | 2346198 | 2/2000 |
| GB | 2352497 | 1/2001 |
| JP | 11-036420 | 2/1999 |
| WO | WO 2004059198 | 7/2004 |

OTHER PUBLICATIONS

The Written Opinion of the International Searching Authority for PCT/US2017/012742; dated Apr. 20, 2017.

Notification of Transmittal of International Search Report and the Written Opinion of the International Searching Authority for PCT/US2017/012742; dated Apr. 20, 2017.

Notification of International Preliminary Report on Patentability for PCT/US2017/012742; dated Jul. 19, 2018.

International Preliminary Report on Patentability for PCT/US2017/012742; dated Jul. 19, 2018.

PRIOR ART

PRIOR ART

PART 1&2 overlaid

MECHANICAL VALVE FOR WATERLESS URINAL

CROSS-REFERENCE TO RELATED APPLICATION

The present application is a non-provisional application of U.S. Provisional Application No. 62/276,180, filed in the United States on Jan. 7, 2016, entitled "MECHANICAL VALVE FOR WATERLESS URINAL," the entirety of which is incorporated herein by reference.

BACKGROUND OF THE INVENTION

(1) Field of Invention

The present invention is directed to an improved valve trap non-flushing urinal system, and more particularly, one which creates a large sealing and flow area using a bell-shaped valve with supporting ribs on its interior surface.

(2) Description of Related Art

Water is a scarce and diminishing resource in many areas of the world. It is widely recognized that more has to be done to conserve its usage as populations grow and climates change. Water-conserving products are becoming more and more important not only for quality of human life, but also for sanitary and subsistence reasons.

In an effort to deal with limited and diminishing resources, there have been many water conserving measures taken all over the world For instance, many municipalities have come up with rationing plans. Others have invested in waste-water recycling treatment and re-use. There have also been many water-conserving products introduced into the market place. These products are being more widely used by industry and homeowners, as regulations become stricter and the costs of water usage rise.

Non-flushing urinal designs use far less water than traditional urinals, saving up to 40,000 gallons of water per year from a single urinal. Non-flushing urinals are made of three major components: a porcelain urinal, a housing, and a cartridge. The cartridge contains a means to seal gas and odor in one direction, and allow fluid flow in the other. The porcelain urinal component is very similar to that of a traditional urinal. The housing replaces a traditional P-trap, which normally would connect a urinal to a building's plumbing. Thus, the housing sits in-line between the building's plumbing and the bottom of the urinal, where the drain pipe would normally connect. The cartridge operates as an odor block, replacing the traditional P-trap, and fits in the housing in a sealed air-tight manner. Notably, the cartridge is designed such that it is to be regularly removed for servicing and replacement.

A mechanical trap acts as a seal against gas and odor emanating from a building's waste pipes. This function is critical, as although human urine is an aqueous solution of greater than 95% water, many of the remaining and predominant constituents tend to degrade into noxious gases. Urine's constituents, in order of decreasing concentration, include urea at 9.3 g/L, chloride at 1.87 g/L, sodium at 1.17 g/L, potassium at 0.750 g/L, creatinine at 0.670 g/L, and other dissolved ions, inorganic, and organic compounds (see NASA Contractor Report No. NASA CR-1802, D. F. Putnam, July 1971). The mechanical valve system works in a similar fashion to a duck bill valve, a well-known type of elastomeric one way valve, which allows for the flow of fluid in one direction, while sealing against back flow of both fluid and low pressure gas in the other.

In many cases, waterless urinal valves are installed into urinals that still have a flushing mechanism. The flushing mechanism—like a flushometer, manufactured by the Sloan Valve Company—can then be set to flush on time, rather than per user. A urinal equipped with such a device saves water from being used each time the urinal is used. This combination of features reflects a desirable configuration, for while the mechanical valve provides the sealing of gas, an occasional flush from the flushometer or cistern helps keep the bowl clean and rinse the pipes. However, this poses a new challenge, as the valve must also accommodate the more significant flow of fluid that occurs when a flush occurs, as compared to just at the moment of urination. Finally, as most of the valves today are made of an elastomer such as molded silicone, over time, the valve tends to stiffen and work less efficiently. This is owing to the valve's repeated exposure to harsh chemicals, from those found in urine, to chlorine-based cleaners.

A second component of the present invention is a valve that is die-cut from a flat stock, or injection molded in a flat shape, then shaped into a bell-shaped membrane, with leaves which overlap each other, creating the valve component inside a waterless urinal cartridge.

The performance of waterless urinal valves is critical for safety, as well as to create for a pleasant experience for the end user. Small subtleties in design can have a large effect on functionality. The present invention makes use of novel geometries, and also combines new and existing technologies, to create a better, more reliable waterless urinal valve. Furthermore, the present invention answers to the commercial demand for an improved waterless urinal valve for at least the following reasons: (1) it opens easily to allow slow flowing urine through; (2) it closes with little or no back pressure; and (3) it can also handle a higher volume of flow when it is flushed by traditional means, or when a bucket of water is dumped in to avoid overflow. It is thus the purpose of the present invention to solve the aforementioned problems endemic to most waterless urinals, as well as to provide the end user with a more pleasant experience.

SUMMARY OF INVENTION

The present invention is directed to an improved valve trap non-flushing urinal system, and more particularly, one which creates a large sealing and flow area using a bell-shaped valve with supporting ribs on its interior surface.

In a first aspect, the present invention teaches a bell shaped waterless urinal valve made of resilient, chemically resistant material.

In another aspect, the valve has rib structures on its inner wall, wherein the rib structures extend into the sealing area of the valve to provide support.

In another aspect, the valve for a waterless urinal is cut in a non-formed shape, then formed to create a flexible bell shaped valve.

In yet another aspect, the present invention teaches a method for making a bell shaped waterless urinal valve comprising acts of forming resilient material into a valve with rib structures on its inner wall, wherein the rib structures extend in to the sealing area of the valve to provide support.

In still another aspect, the present invention teaches the previously articulated method, now wherein the valve is cut in a non-formed shape, then formed to create a flexible bell shaped valve.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION OF THE INVENTION

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise, and counter clockwise have been used for convenience purposes only and are not intended to imply any particular fixed direction. Instead, they are used to reflect relative locations and/or directions between various portions of an object.

Figure 1:
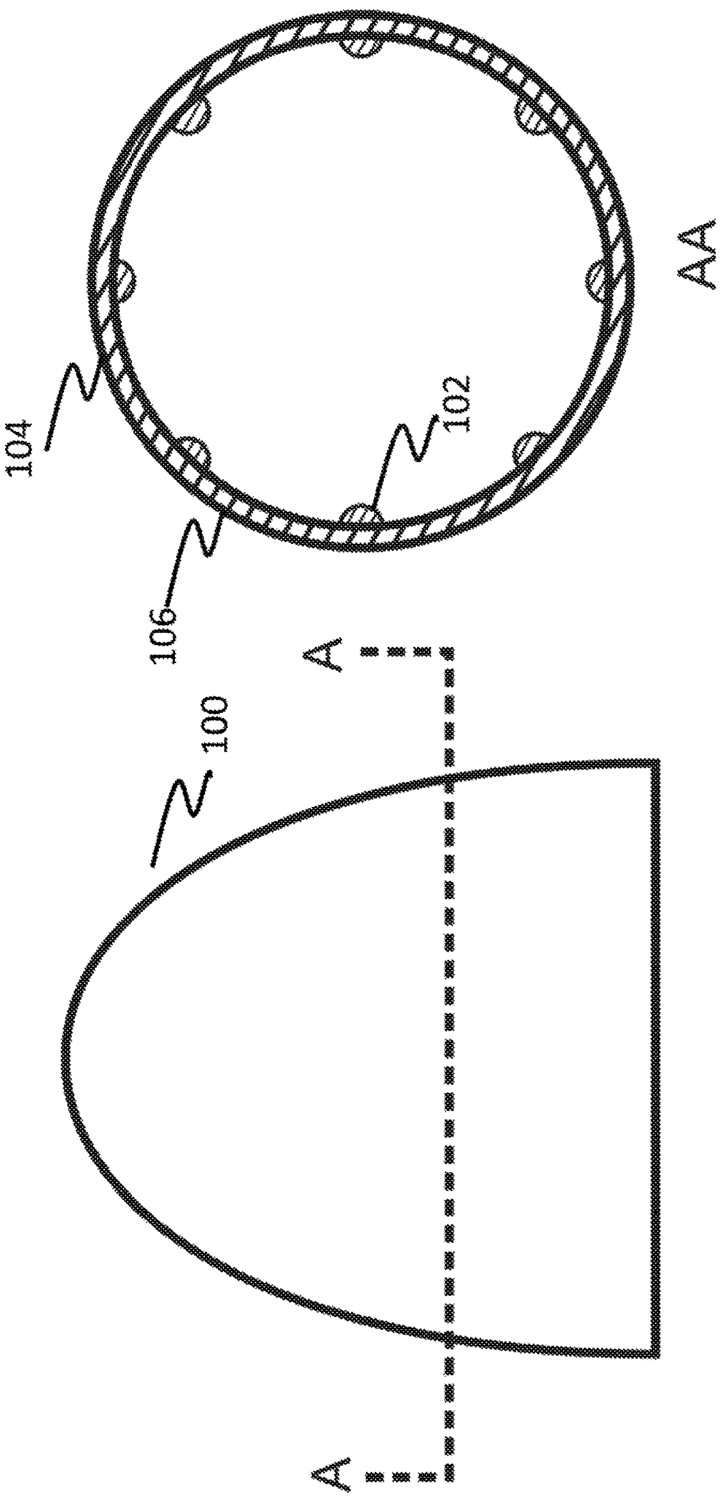
FIG. 1 is a drawing of a resilient bell-shaped valve on left with cross section AA, where cross section AA is shown on the right.

The present invention is exemplified by numerous configurations with many distinctive features, as set forth in the drawings attached to this paper. In FIG. 1, for instance, a bell-shaped valve 100 is prominently displayed. The bell-shaped valve 100 is made of a resilient (both structurally and chemically) material such as silicone, and has a plurality of ribs 102, which reside on the inside of the valve wall 104.

Figure 2:
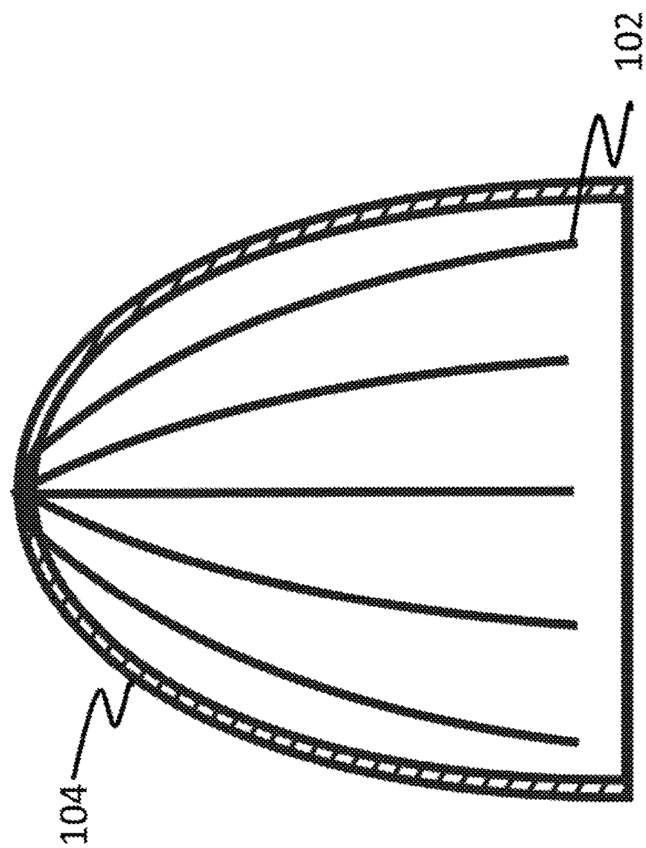
FIG. 2 is a drawing of a cross section of a bell-shaped valve in vertical cut direction, where the reinforcing ribs can be seen on the back wall.
Figure 3:
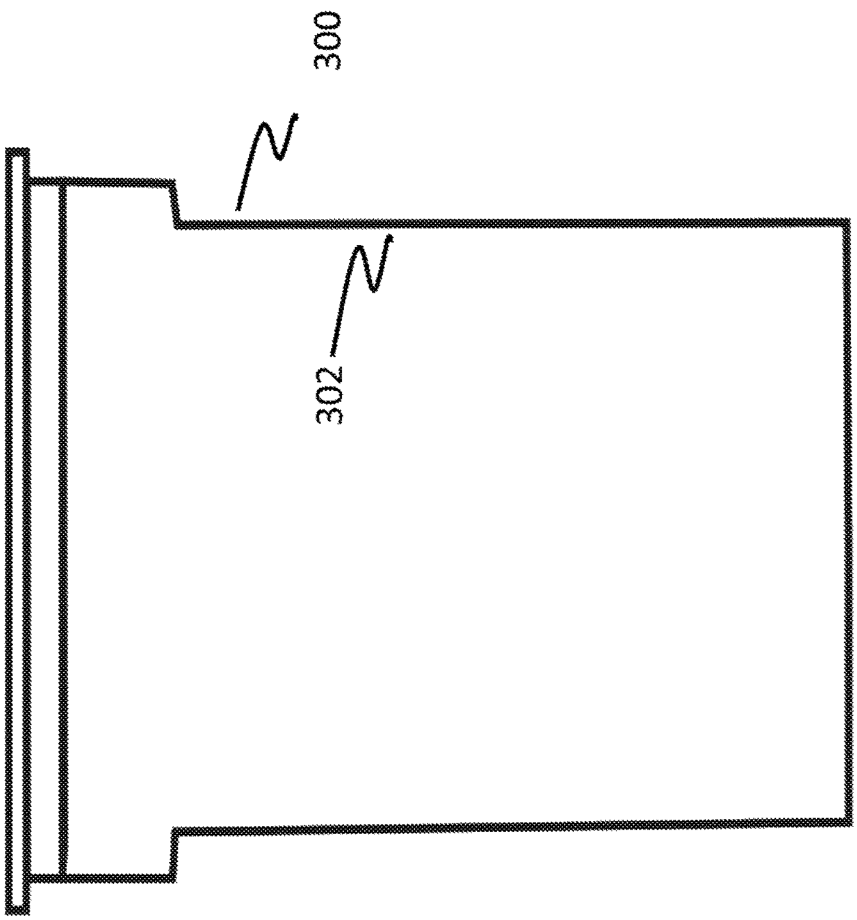
FIG. 3 is a drawing of the cartridge body, which holds the bell-shaped valve inside.

FIG. 2 shows a cutaway or cross-sectional view of bell-shaped valve 100, wherein ribs 102 are prominently displayed, now in a lengthwise fashion. Moving on to FIG. 3, cartridge 300 is shown, within which the bell-shaped valve 100 fits.

Figure 4:
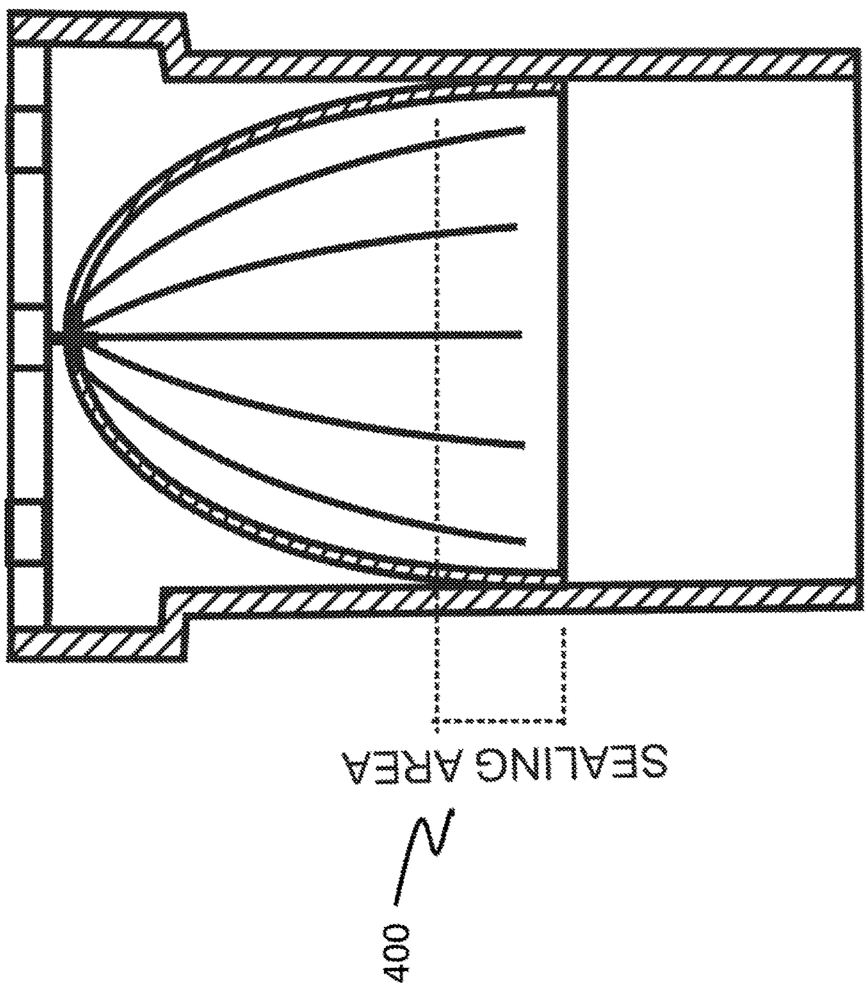
FIG. 4 depicts a cross section of a cartridge housing with a bell-shaped valve inserted.
Figure 5:
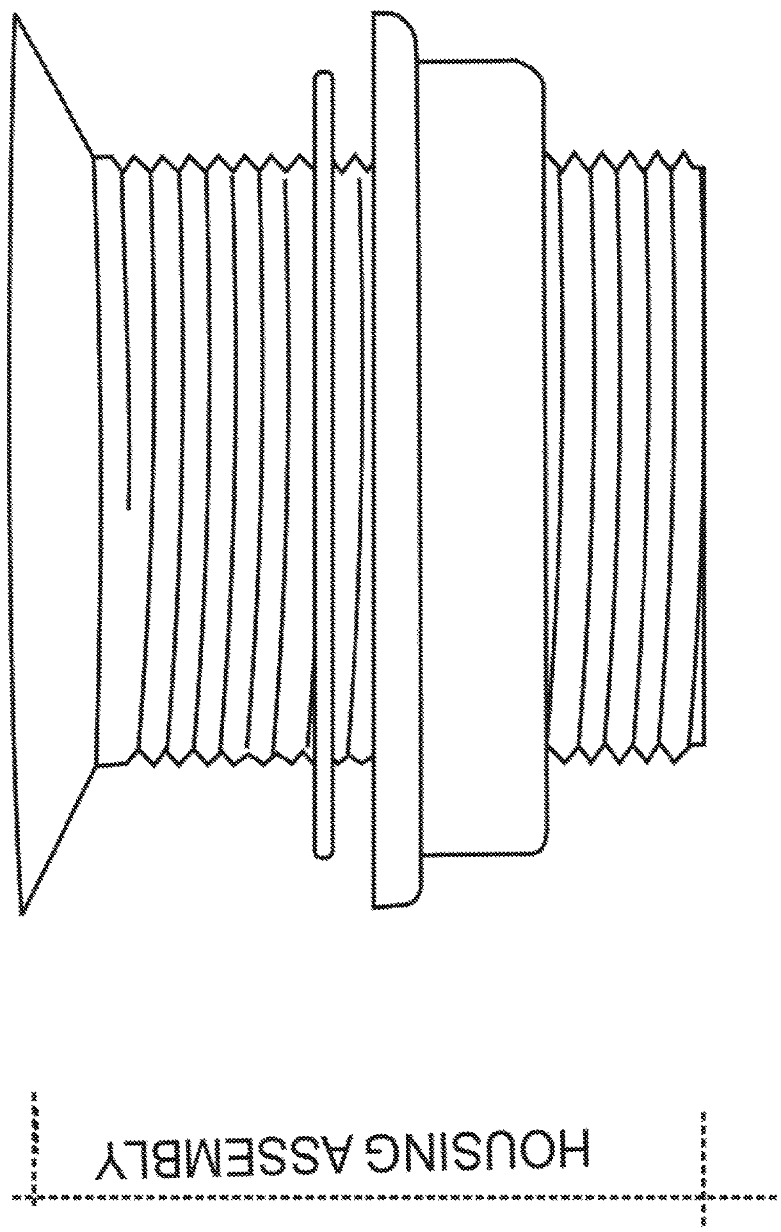
FIG. 5 is a drawing of an adapter or housing which holds a cartridge, and is secured to hole in bottom of urinal in use.
Figure 6:
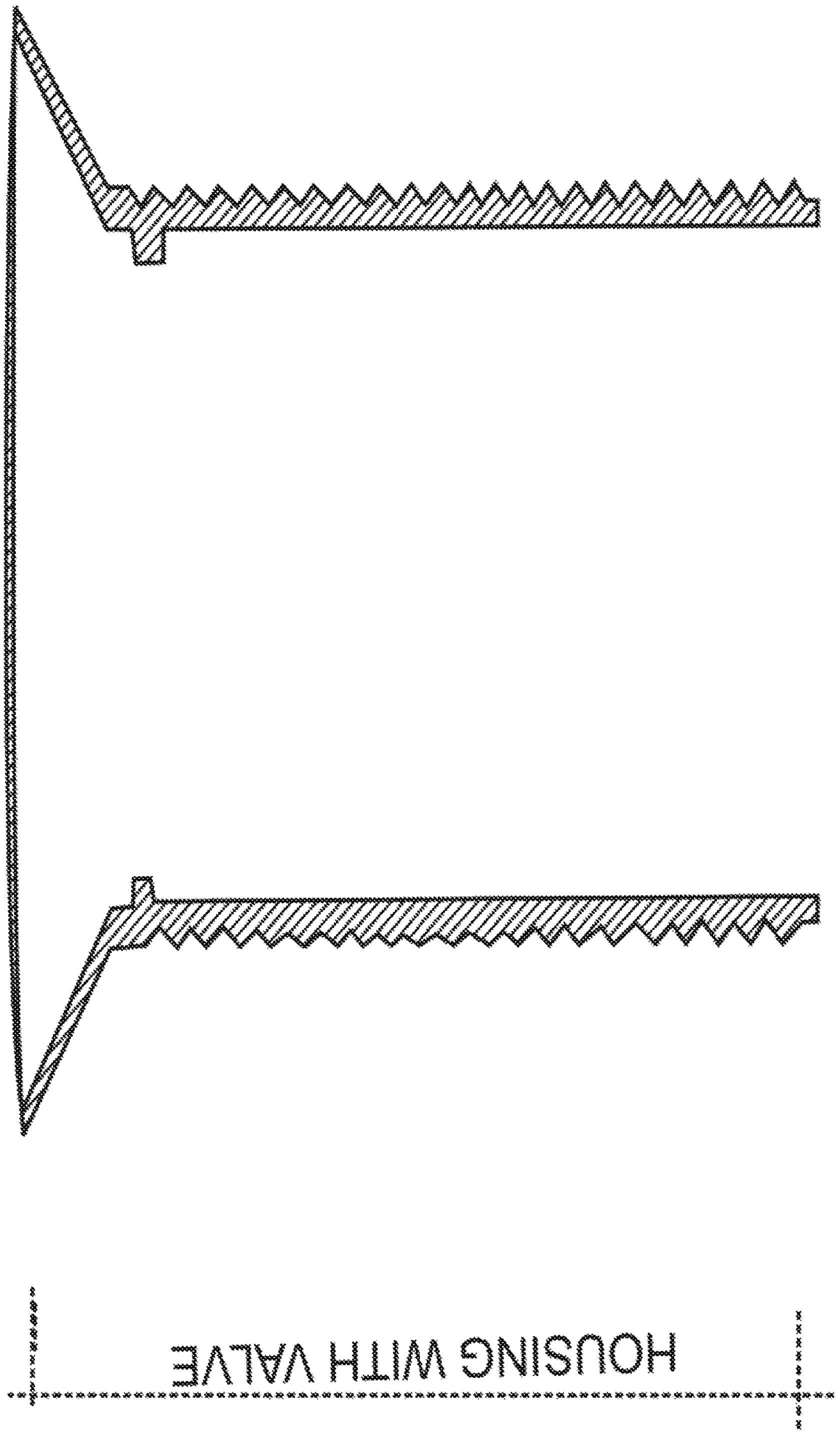
FIG. 6 is a depiction of an adapter which has been cross sectioned from side view.
Figure 7:
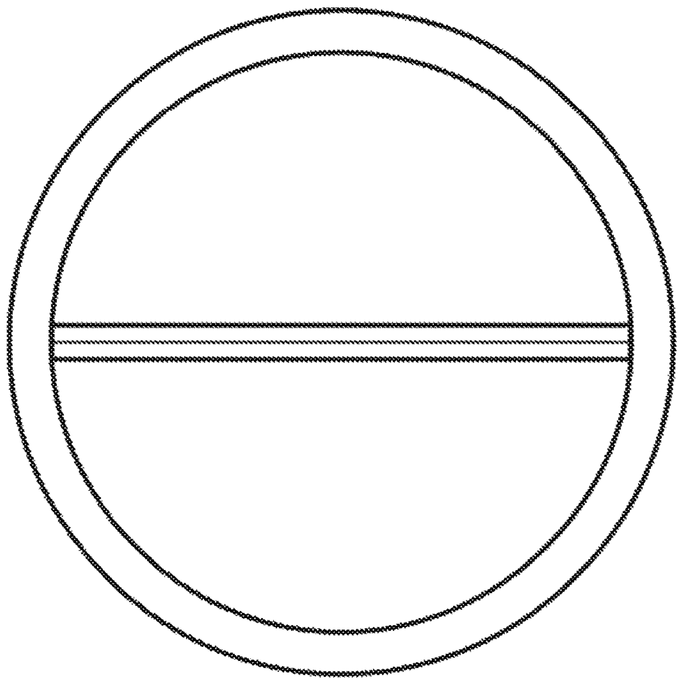
FIG. 7 is a drawing of a prior art valve from a top-down view.
Figure 8:
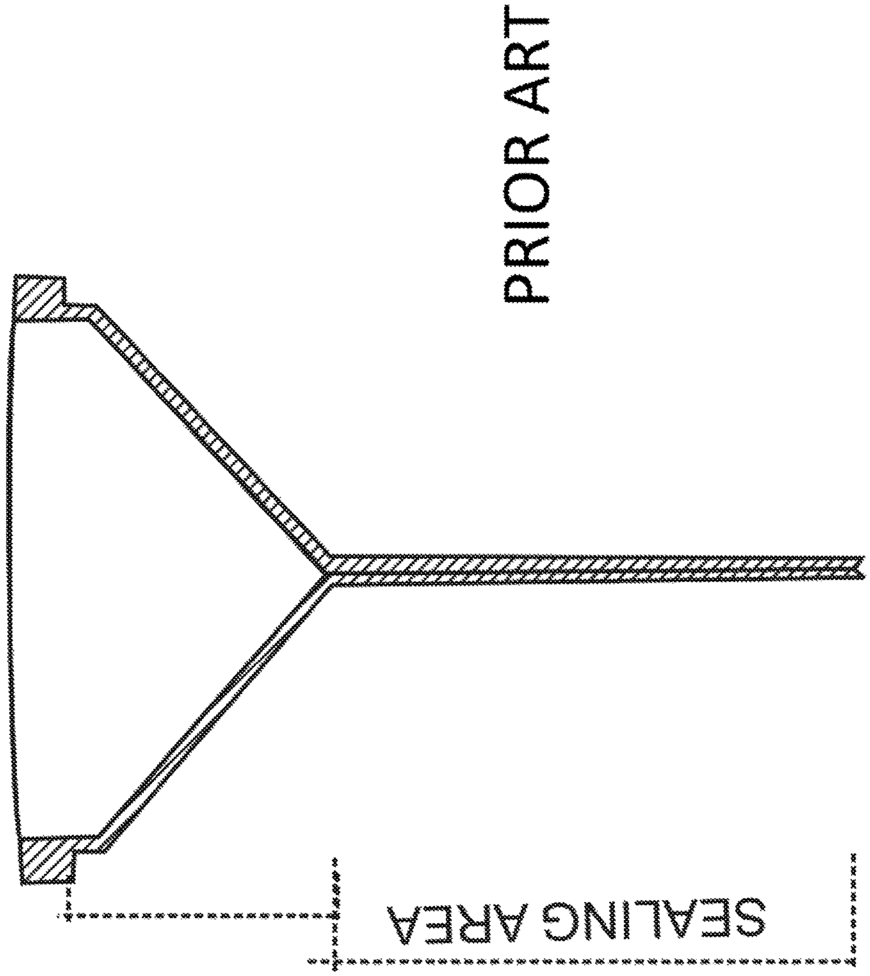
FIG. 8 is a drawing of a prior art valve from side-view in cross section.
Figure 9:
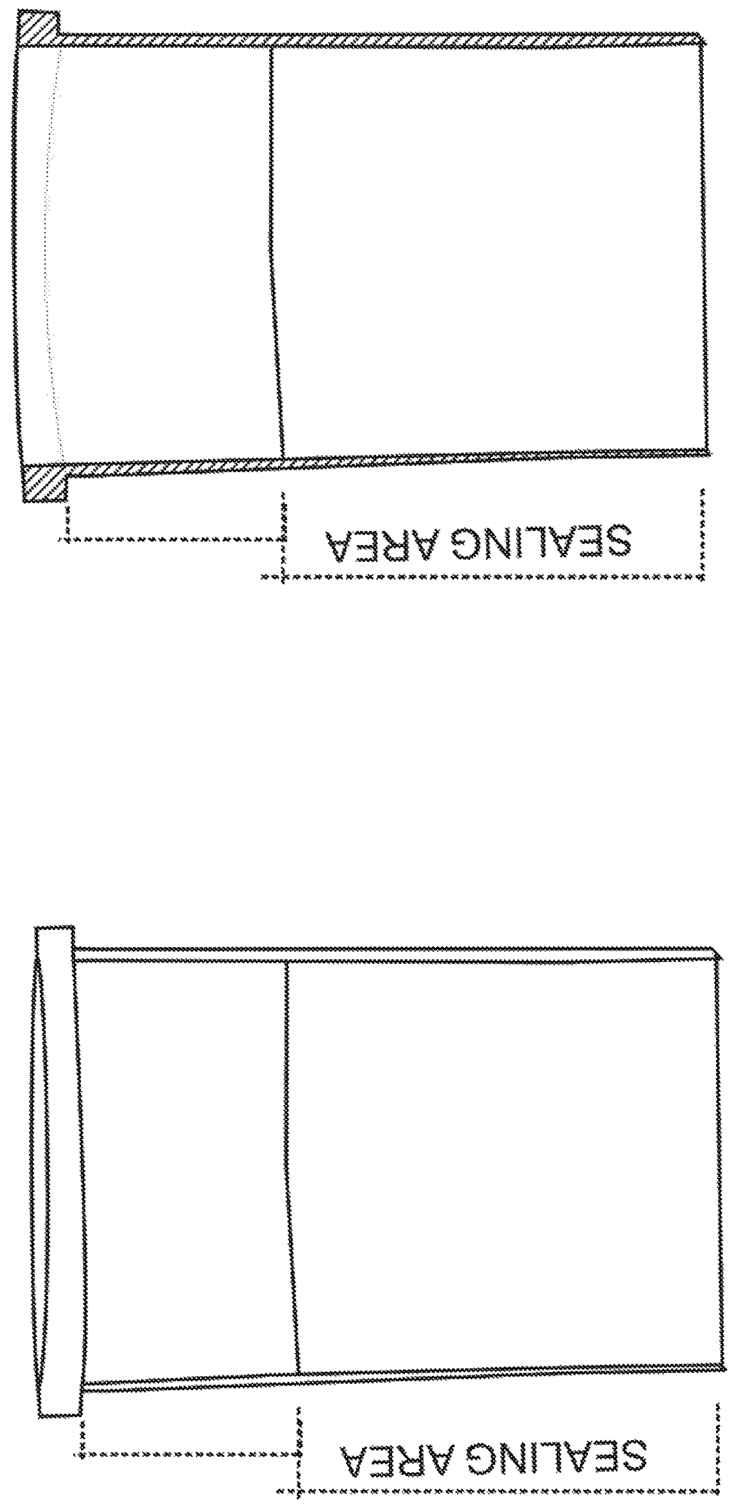
FIG. 9 is a drawing of the same valve as seen in FIG. 8, now rotated 45 degrees, where the image on left is a full valve, and the image on the right is a cross section.
Figure 10:
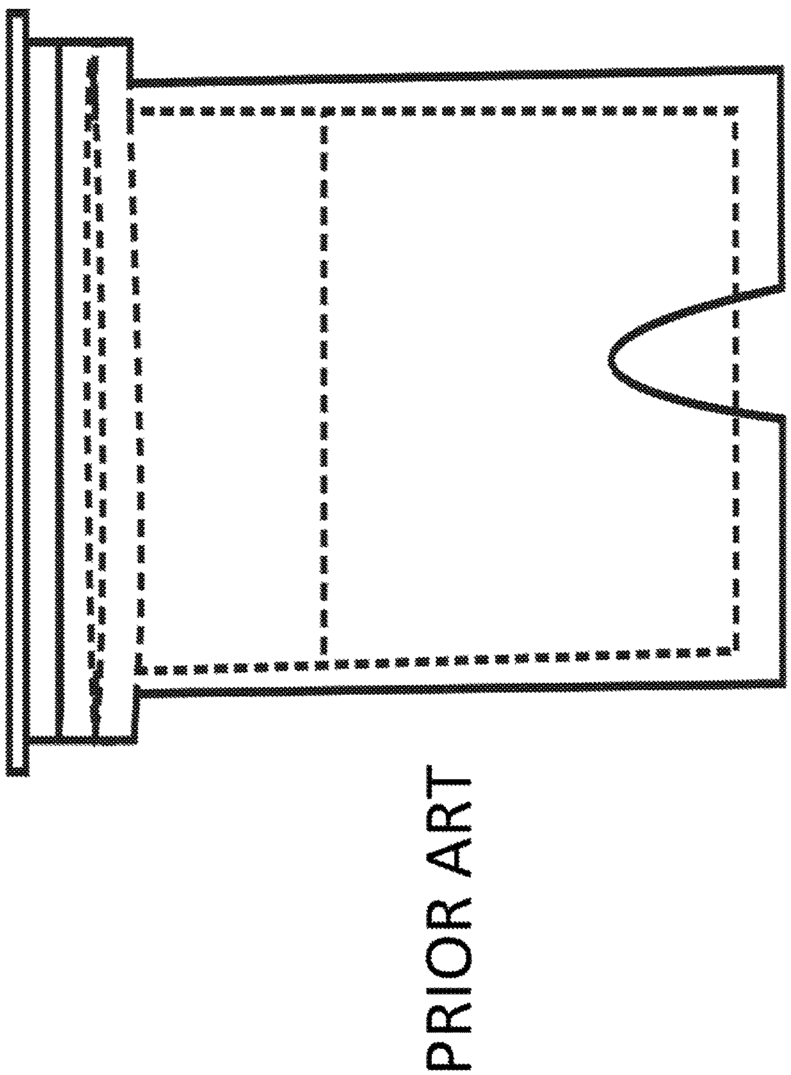
FIG. 10 is a drawing of the valve from FIG. 9 in dotted line form, residing inside of the cartridge body.

Moving now to FIG. 4, ribs 102 run from the top of the bell-shaped valve 100 down in to the sealing area 400, thus transferring stiffness from the non-sealing area of the valve to the sealing area 400 of the valve 100. The benefits of using internal ribs are numerous. These include the fact that the ribs 102 are easily manipulated in shape and size to alter stiffness, while the length of the overlap of the ribs 100 into the sealing area 400 can also be adjusted to change the stiffness of the valve 100 against opening. By placing the ribs 102 inside the valve 100, the ribs 102 are advantageously permitted to enter the sealing area, and are also prevented from disrupting the smooth outer valve surface 106 required to seal against the inner wall 302 of the cartridge 300.

The bell-shaped valve 100 is also much easier to mold than a prior art valve seen in FIGS. 7-10. This is because the prior art valve requires a very thin portion of the mold—paper thin in some areas—to separate the two sealing halves that make up the sealing area. This is very difficult to mold. With the bell-shaped valve 100 of the present invention, there are no elongated thin areas where two halves must be molded and separated by very thin mold or tool sections. Those skilled in the art of duckbill style valve manufacture are highly familiar with the challenge of very thin separations in a mold, which fact marks the bell-shaped valve 100 of the present invention as an overall improvement in terms of comparable ease of manufacture.

In order to allow better resistance to harsh cleaners and other chemicals that the valve 100 regularly faces in use, the bell-shaped valve 100 can be manufactured of materials such as polypropylene, polyethylene, and polyvinyl chloride, or other chemically resistant materials. However, given that flexibility and resilience are critical to performance, the valve 100 can also be constructed in a novel manner that resembles the leaves of a flower. This sort of overlapping structure has many advantages. For example, the valve 100 is easy to mold or die cut—as there are no elongated, super-thin areas of the mold. In the case of die cutting, no mold is necessary to use at all. The increased ease of manufacture, with such a configuration, also saves tooling costs. Additionally, materials such as polypropylene, polyethylene, and polyvinyl chloride, which are chemically resistant, but not as naturally resilient as traditional duck bill valve materials, can be used.

Figure 11:
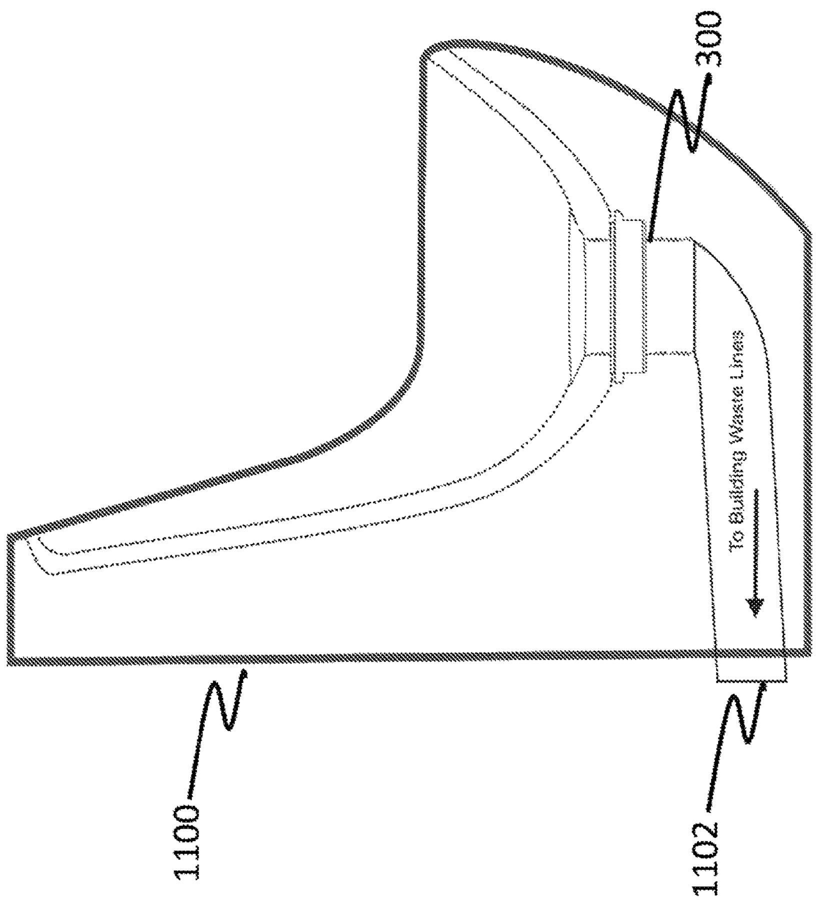
FIG. 11 is a drawing from a side view, with a housing inserted and a drain pipe attached (urinal 1100, cartridge 300 inserted, drain valve 1102)

FIG. 11 depicts a drawing of a urinal 1100 from a side view, with a cartridge 300 inserted and a drain pipe 1102 attached.

Figure 12:
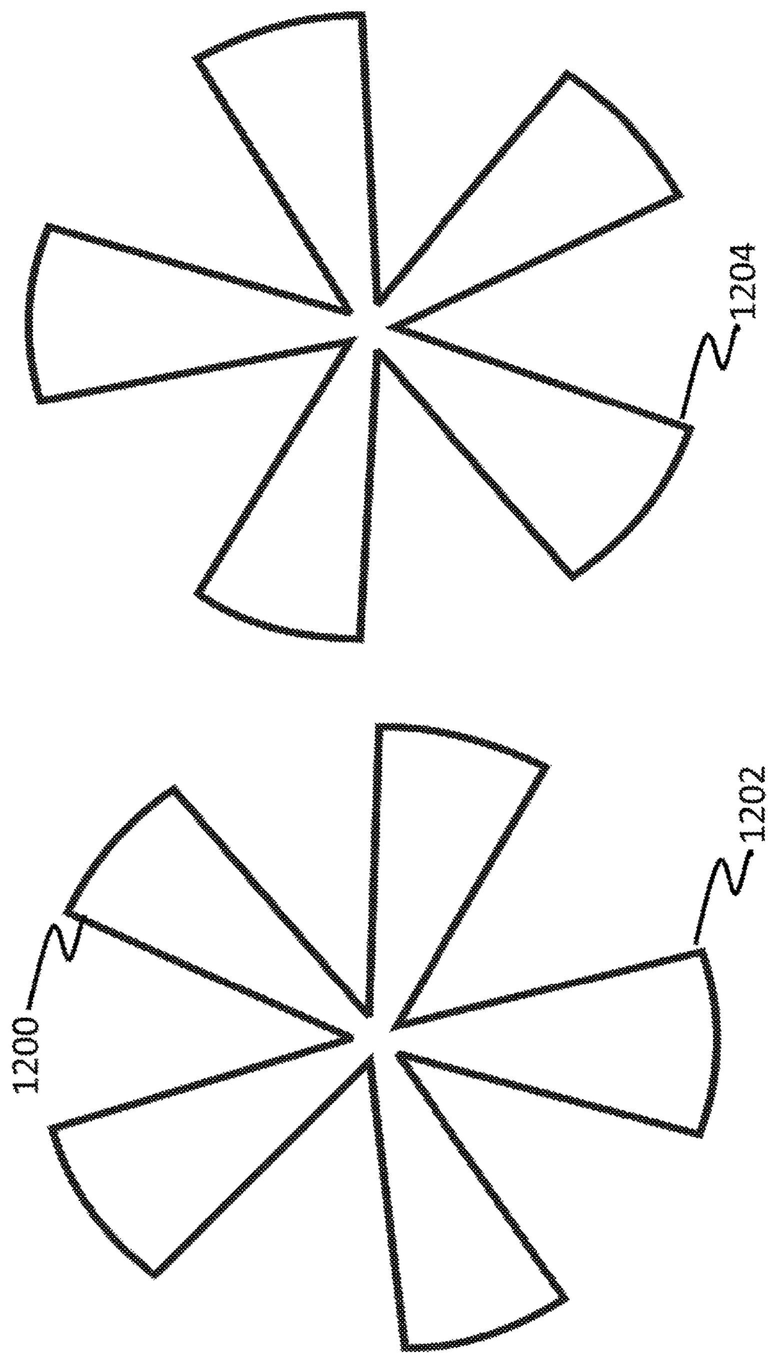
FIG. 12 depicts an unformed version of the bell-shaped valve, which uses two parts to create the overall valve component.

Moving to FIG. 12, when the valve 100 is constructed in the aforementioned manner, the leaves 1200 of the valve 100 can flex and slip past one another in use, allowing urine and flushing water to pass, while returning to a shape which will seal against the inside wall 302 of the cartridge body 300. Such a structure can be formed by using a plurality pieces laid on top of each other. Pieces 1202 and 1204 are designed to be configured in just this way.

Figure 13:
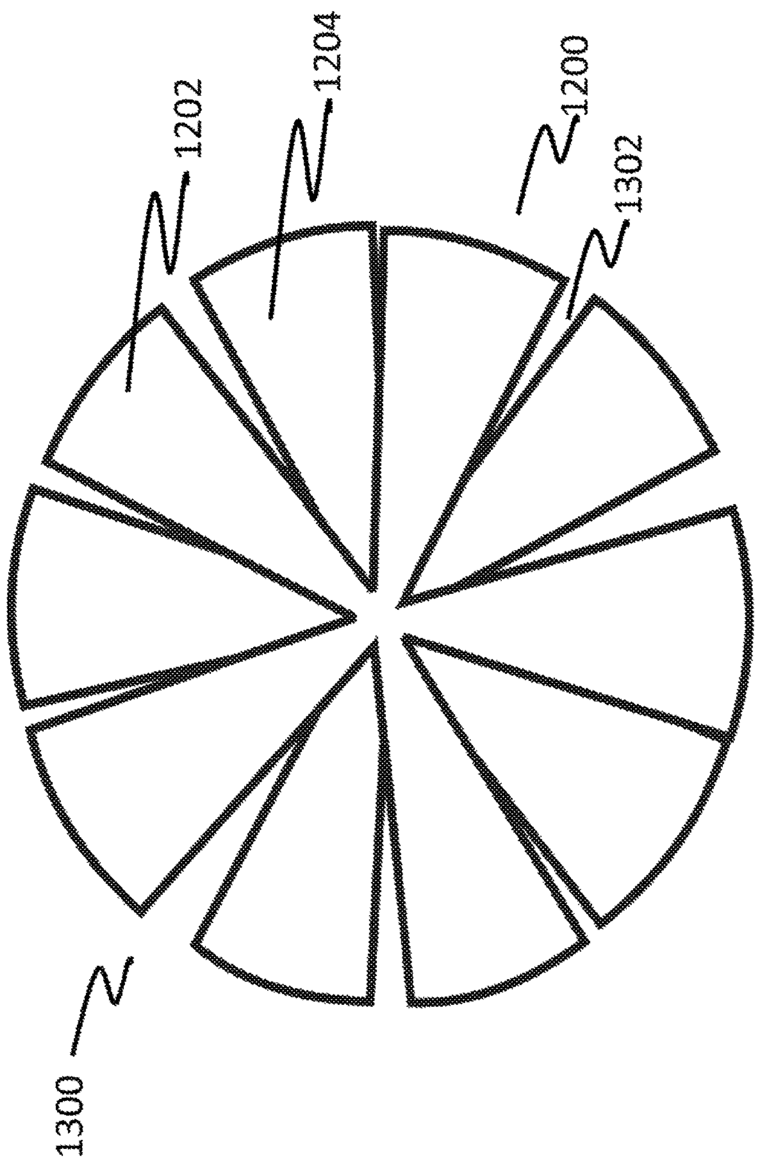
FIG. 13 illustrates the two parts from FIG. 12, now overlaid and ready for forming.
Figure 14:
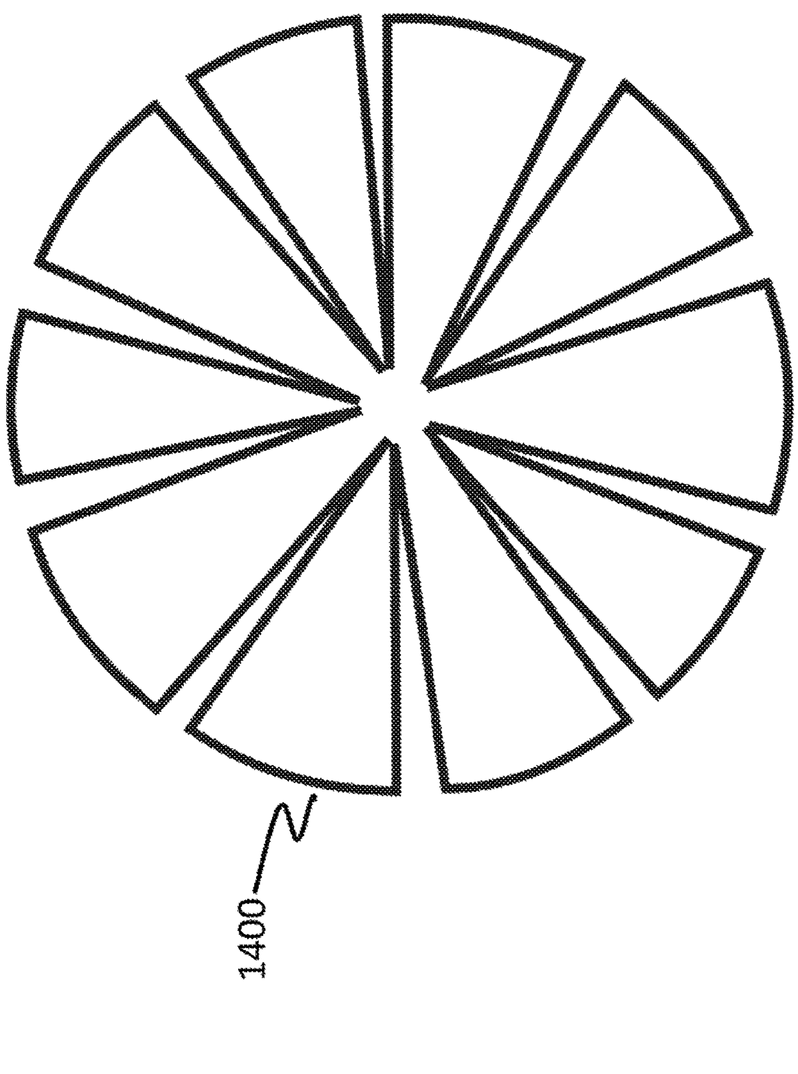
FIG. 14 depicts a single part unformed version of the bell-shaped valve. Here, the leaves of the valve are created in a single piece rather than multiple parts.

FIG. 13 demonstrates how the relatively flat molded (or cut) valve parts 1202 and 1204, when combined, feature empty spaces, e.g., 1300 and 1302, between the leaves 1200, while FIG. 14 depicts a single part unformed version of the bell-shaped valve. Here, the leaves of the valve 1400 are created in a single piece rather than multiple parts.

Figure 15:
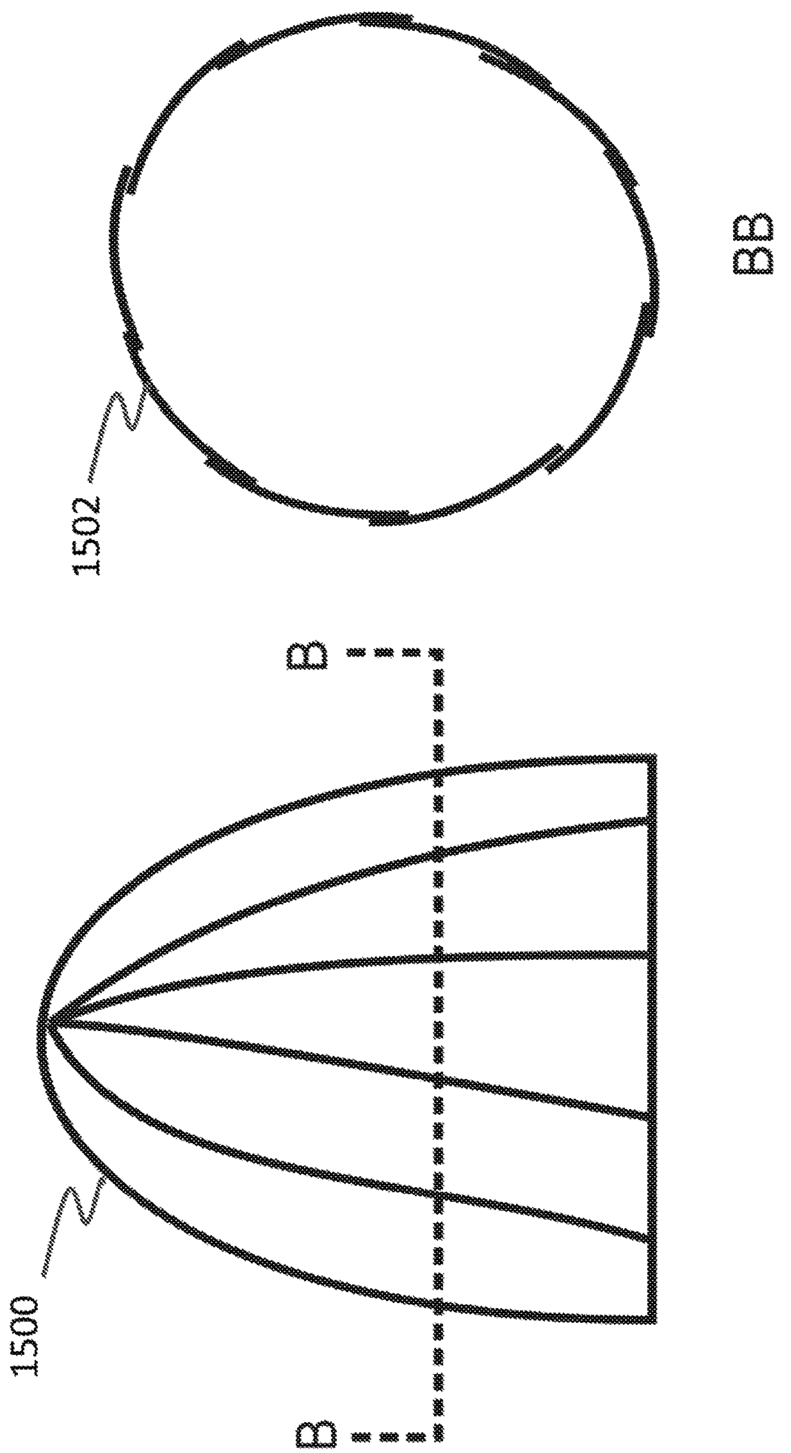
FIG. 15 is a drawing of a formed version of the leaved bell-shaped valve, with a side view on left, and a cross section on the right.
Figure 16:
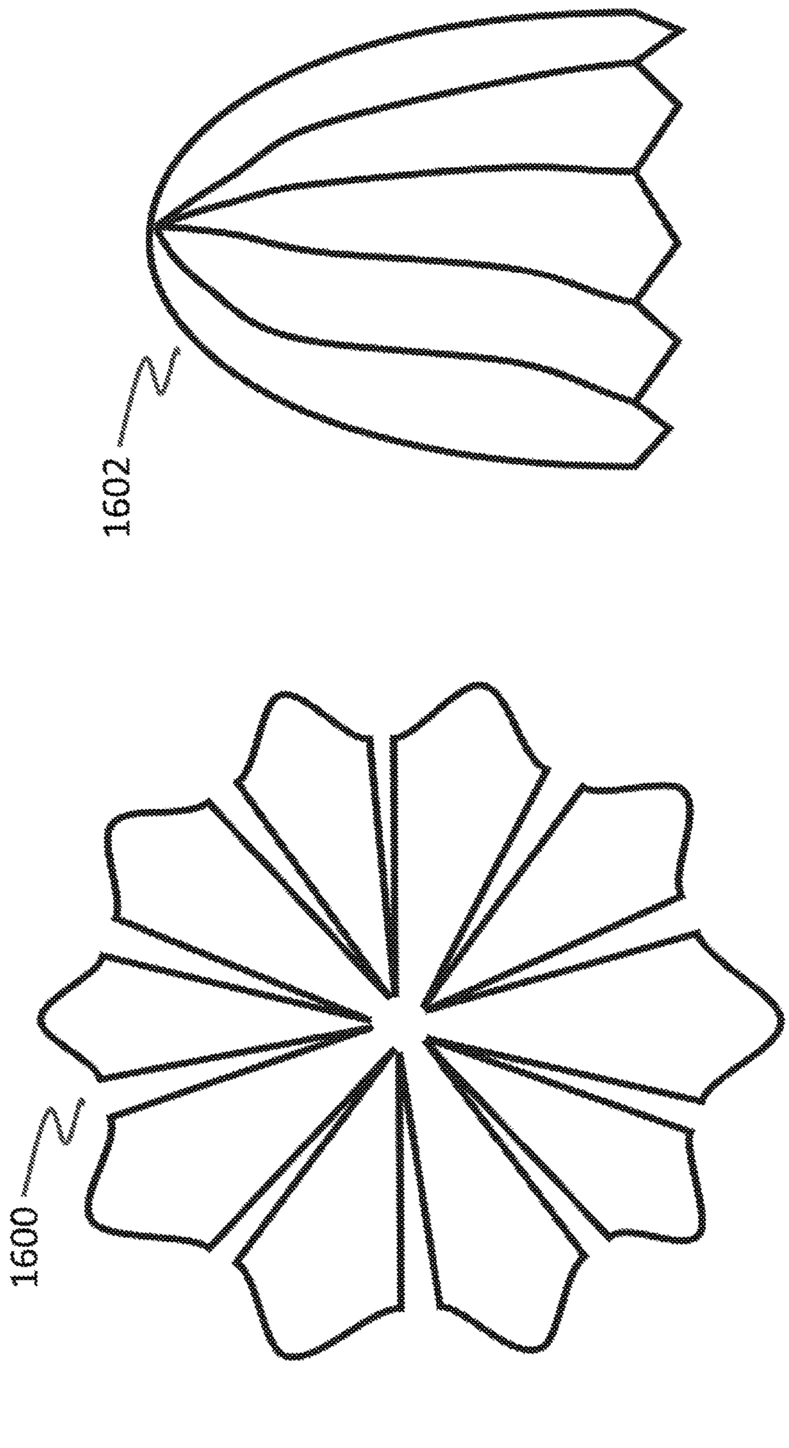
FIG. 16 is a drawing of an unformed and formed leaved bell-shaped valve, wherein the leaves are brought substantially to a point at the end in order to create drip edges for the valve once formed.

Once the valve 100 is inserted into a cartridge tube 300, the leaves overlap in a yet more articulate fashion, and the shape of the valve 100 is then like that of 1500 in FIG. 15. This overlapping structure 1500 can be seen in FIG. 15, now in a different aspect, namely a cross-sectional view 1500. The "leaves" of the flower shape can also be shaped to create drip edges once the valve is put into its formed bell 1500, of which 1502 displays a cross-sectional view. In. FIG. 16, this can be seen in its pre-formed shape 1600, and its formed shape 1602.

What is claimed is:

1. A bell-shaped waterless urinal valve comprising:

a plurality of adjacent leaves having spaces therebetween, wherein each of the plurality of adjacent leaves is configured to overlap with an adjacent leaf when the valve is inserted into a urinal cartridge.

2. The valve for a waterless urinal as set forth in claim 1, cut in a non-formed shape, then formed to create a flexible bell-shaped valve.

3. The valve for a waterless urinal as set forth in claim 1, where the valve is formed of a resilient, chemically resistant material.

4. The valve for a waterless urinal as set forth in claim 2, where the valve is formed of a resilient, chemically resistant material.

5. A method for making a bell-shaped waterless urinal valve comprising an act of:

forming resilient material into a valve comprising a plurality of adjacent leaves having spaces therebetween; and forming each of the plurality of adjacent leaves to overlap with an adjacent leaf when the valve is inserted into a urinal cartridge.

6. The method as set forth in claim 5, wherein the valve is cut in a non-formed shape, then formed to create a flexible bell-shaped valve.

7. The method as set forth in claim 5, wherein the valve is formed of a resilient, chemically resistant material.

8. The method as set forth in claim 6, wherein the valve is formed of a resilient, chemically resistant material.

9. The method as set forth in claim 7, further comprising an act of making the bell-shaped waterless urinal valve with a single piece of resilient, chemically resistant material.

10. The method as set forth in claim 7, further comprising an act of making the bell-shaped waterless urinal valve with a plurality of pieces of resilient, chemically resistant material pieces laid on top of each other.

* * * * *